(12) United States Patent
Shaw et al.

(10) Patent No.: US 7,486,624 B2
(45) Date of Patent: Feb. 3, 2009

(54) MULTIPLE AND PARALLEL ACCESS NETWORK TAP FOR GIGABIT INTERNET LANS

(76) Inventors: Robert E. Shaw, 16161 Blossom Hill Rd., Los Gatos, CA (US) 95032; Eldad Matityahu, 842 Boyce, Palo Alto, CA (US) 94301

(*) Notice: Subject to any disclaimer, the term of this patent is extended or adjusted under 35 U.S.C. 154(b) by 1163 days.

(21) Appl. No.: 10/667,107

(22) Filed: Sep. 19, 2003

(65) Prior Publication Data

US 2005/0071711 A1    Mar. 31, 2005

(51) Int. Cl.
*H04L 12/28* (2006.01)
*H04J 3/14* (2006.01)
*G08C 15/00* (2006.01)
*G06F 11/00* (2006.01)
*G01R 31/08* (2006.01)

(52) U.S. Cl. .......... 370/242; 370/252; 709/224; 714/27

(58) Field of Classification Search ......... 370/235–241, 370/247–252; 709/224–239; 714/27–41
See application file for complete search history.

(56) References Cited

U.S. PATENT DOCUMENTS 5,898,837 A * 4/1999 Guttman et al. ............ 709/224

* cited by examiner

*Primary Examiner*—M. Phan
(74) *Attorney, Agent, or Firm*—George S. Cole

(57) ABSTRACT

A single-usage network tap monitors network information flow over a particular connection. Instead of requiring a tap for each analytical device, by incorporating elements that regenerate, spread, and coordinate the timing of the signal, multiple, simultaneous, and parallel analytical devices can monitor a particular network connection through one tap, It incorporates four amplifiers preferably manufactured on the same IC die with high-impedance input terminals connected directly to the two conductors of a gigabit Ethernet local area network digital transmission line so as not to load or otherwise upset its impedance or other parameters. The output terminals of the operational amplifiers are connected to and match the input impedance of the digital transmission protocol Gigabit analyzer. The gain of the operational amplifiers is arranged so as to replicate at the input of the analyzer the signals appearing on the Gigabit local area network transmission line with uninterruptible power supply.

9 Claims, 7 Drawing Sheets

Interior top view with logical front view

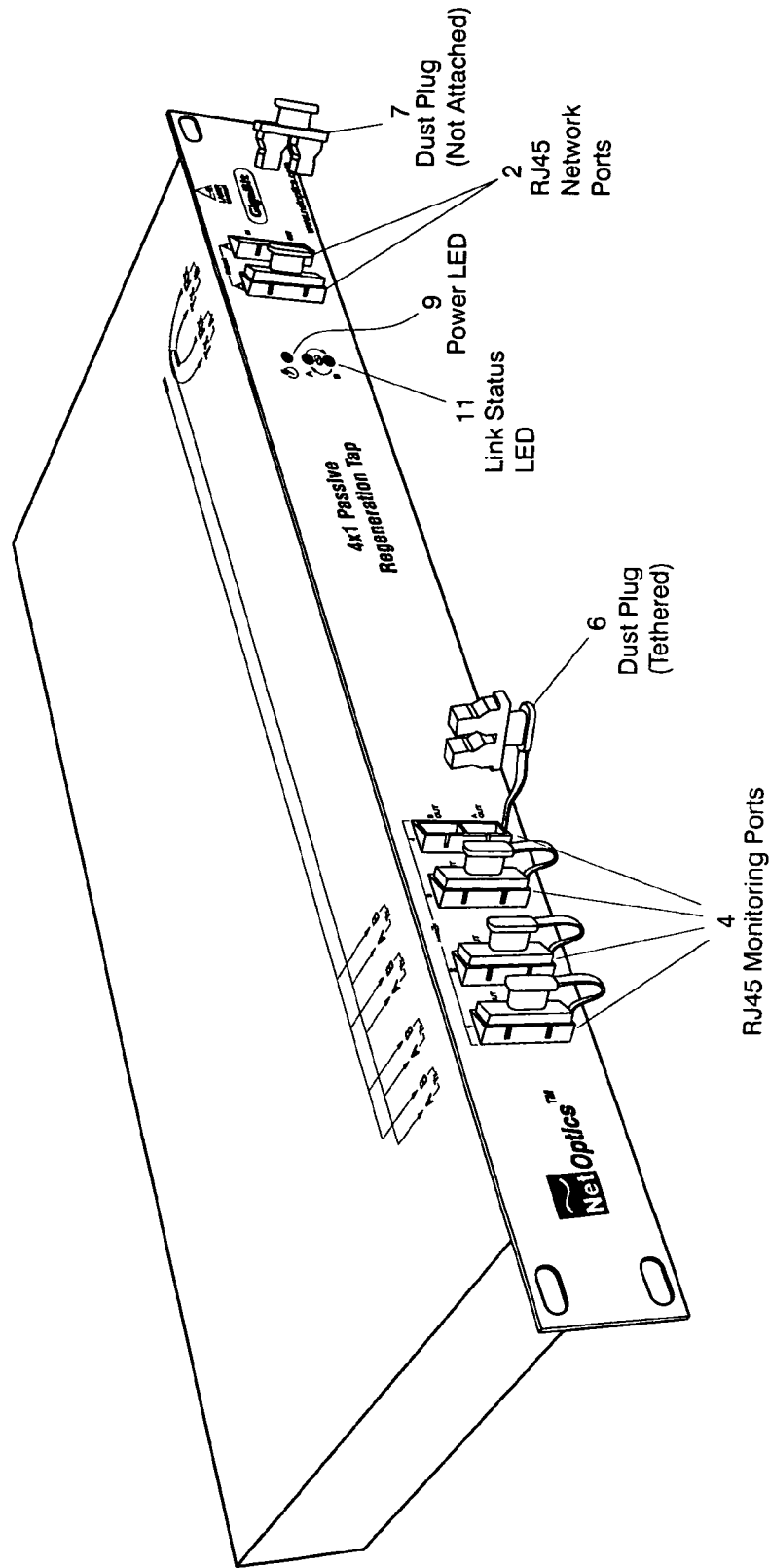
FIG. 1  Exterior front perspective view

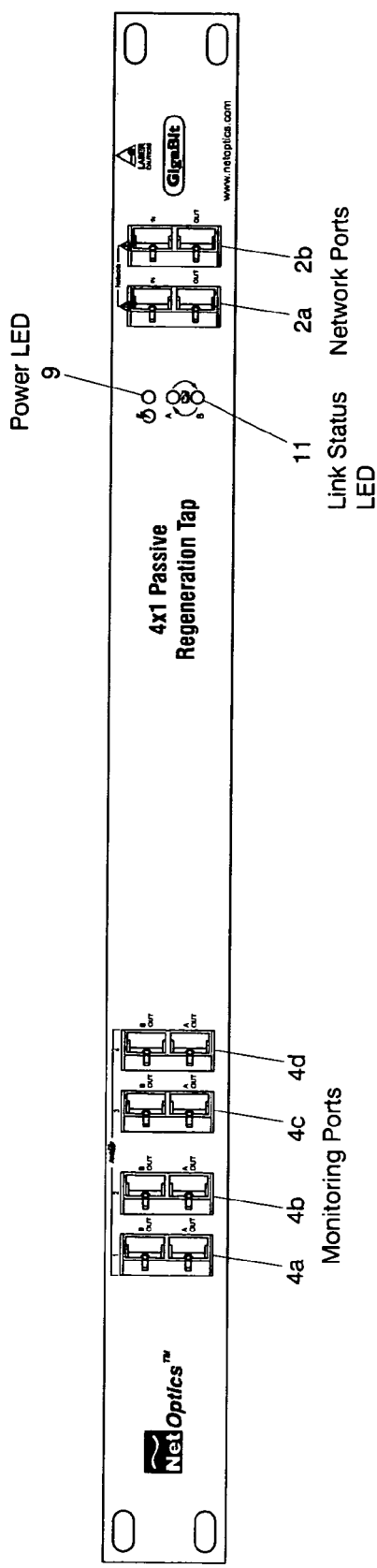
FIG. 2  Exterior front view

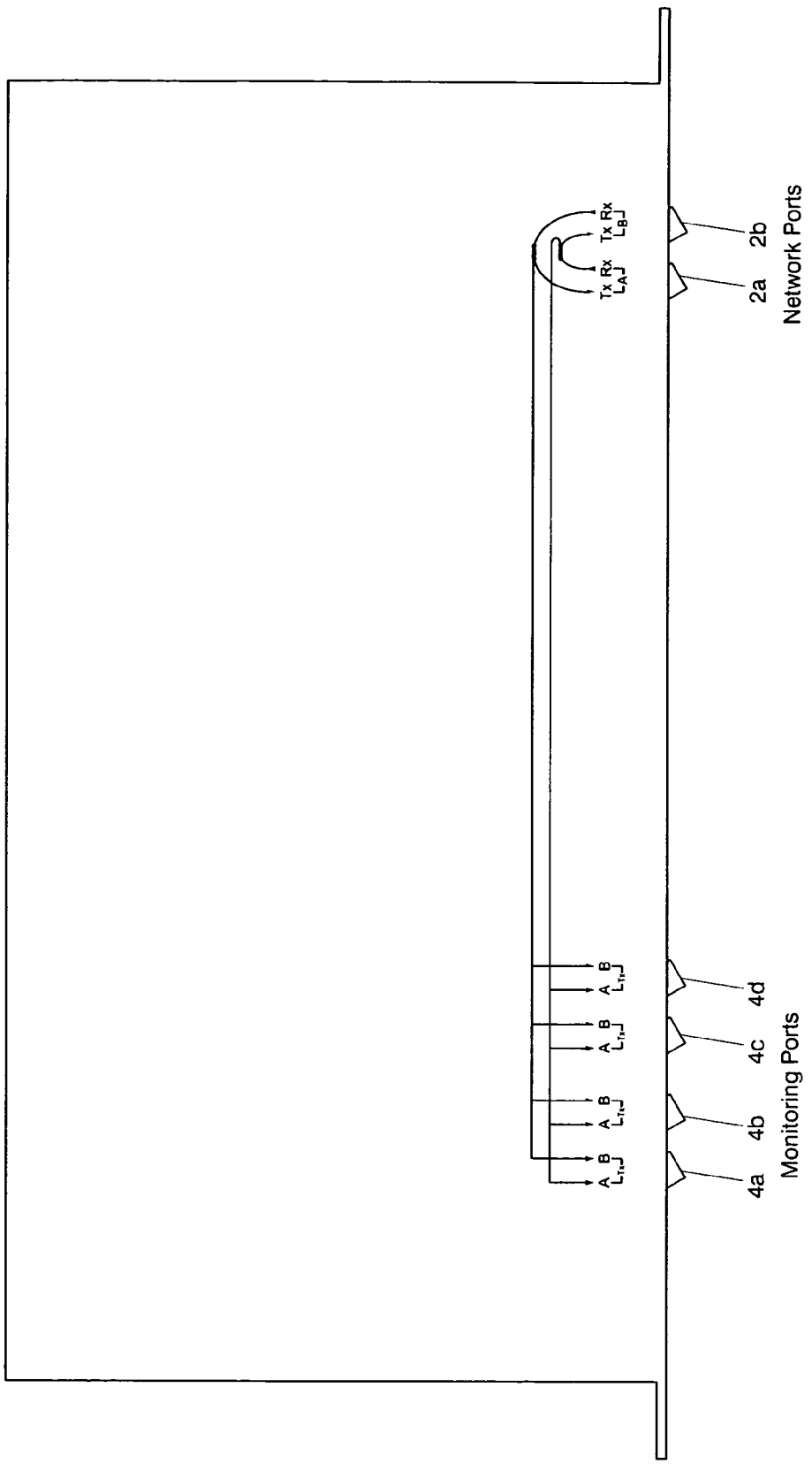
FIG. 3 Exterior top view

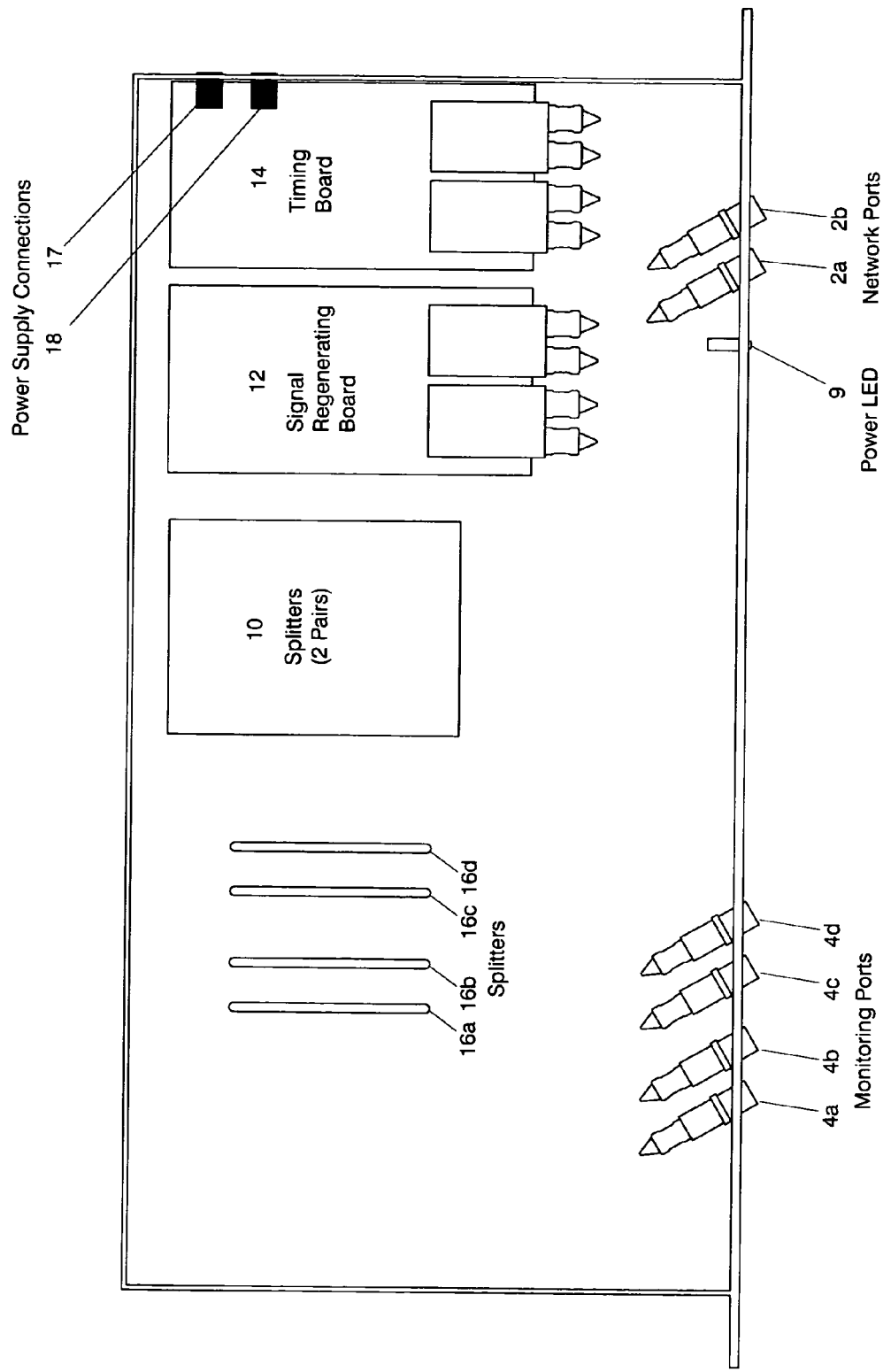
FIG. 4 Interior top view

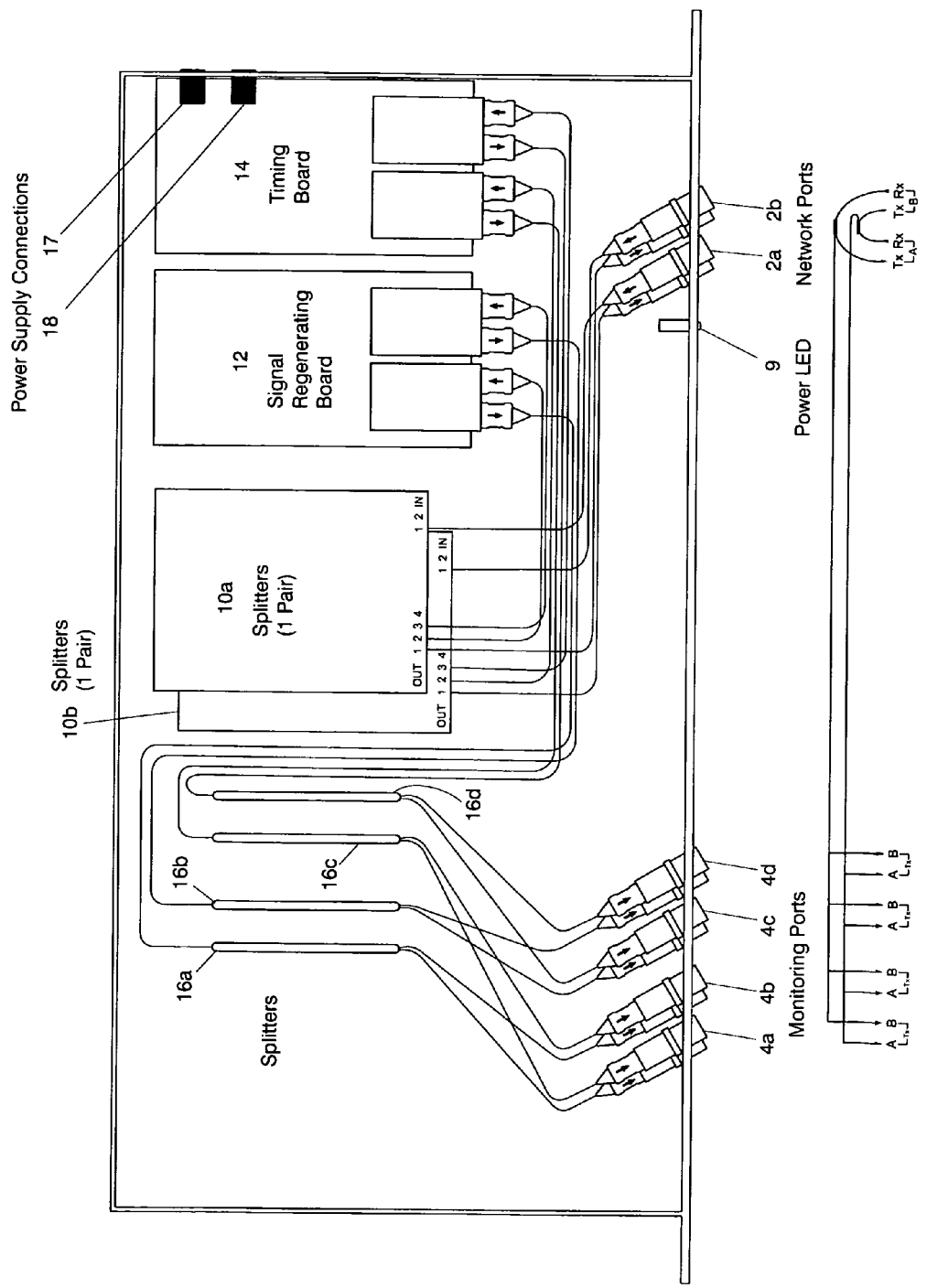
FIG. 5  Interior top view with logical cabling paths and port offsets for clarity

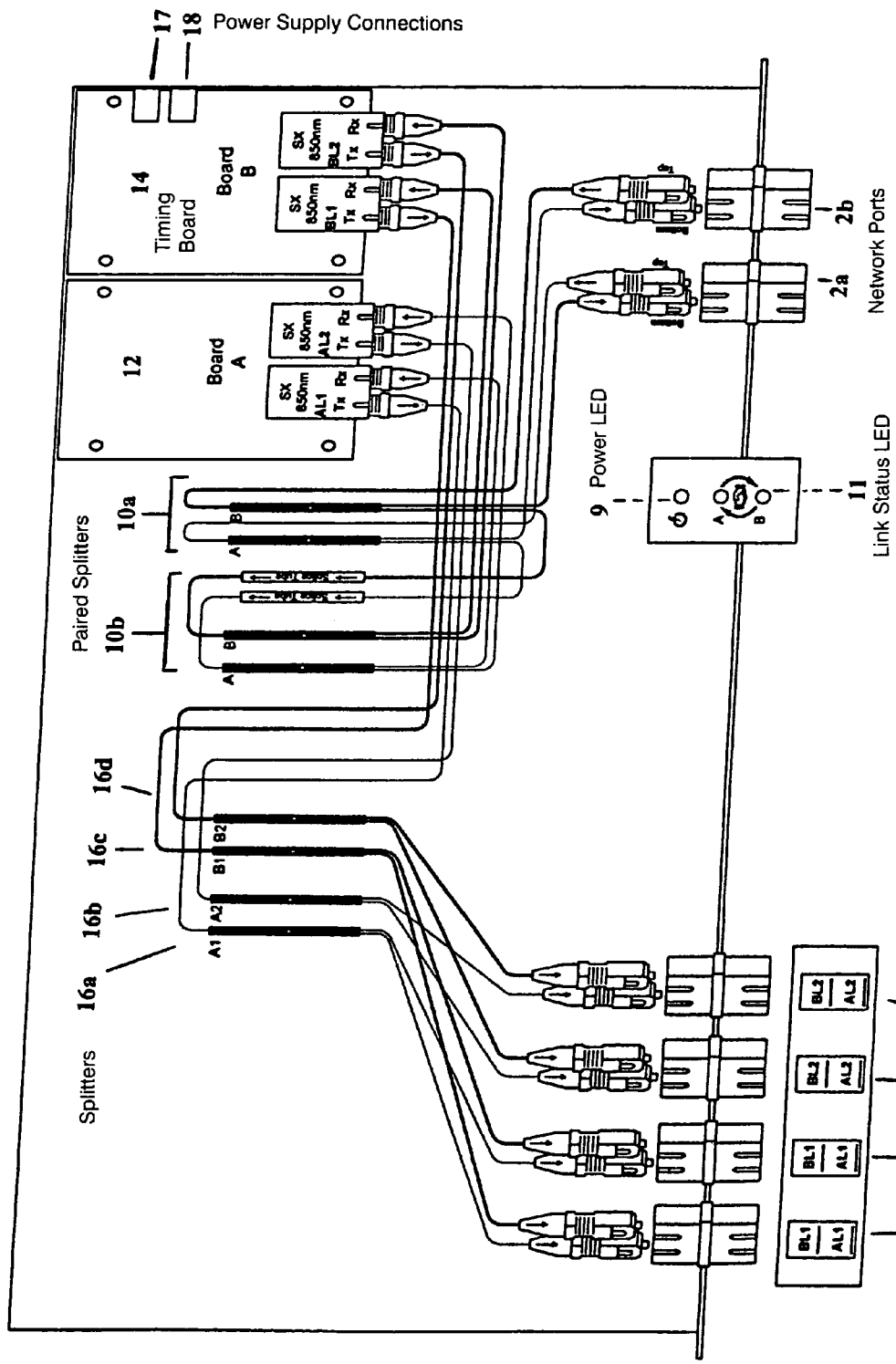
FIG. 6  Interior top view with logical front view

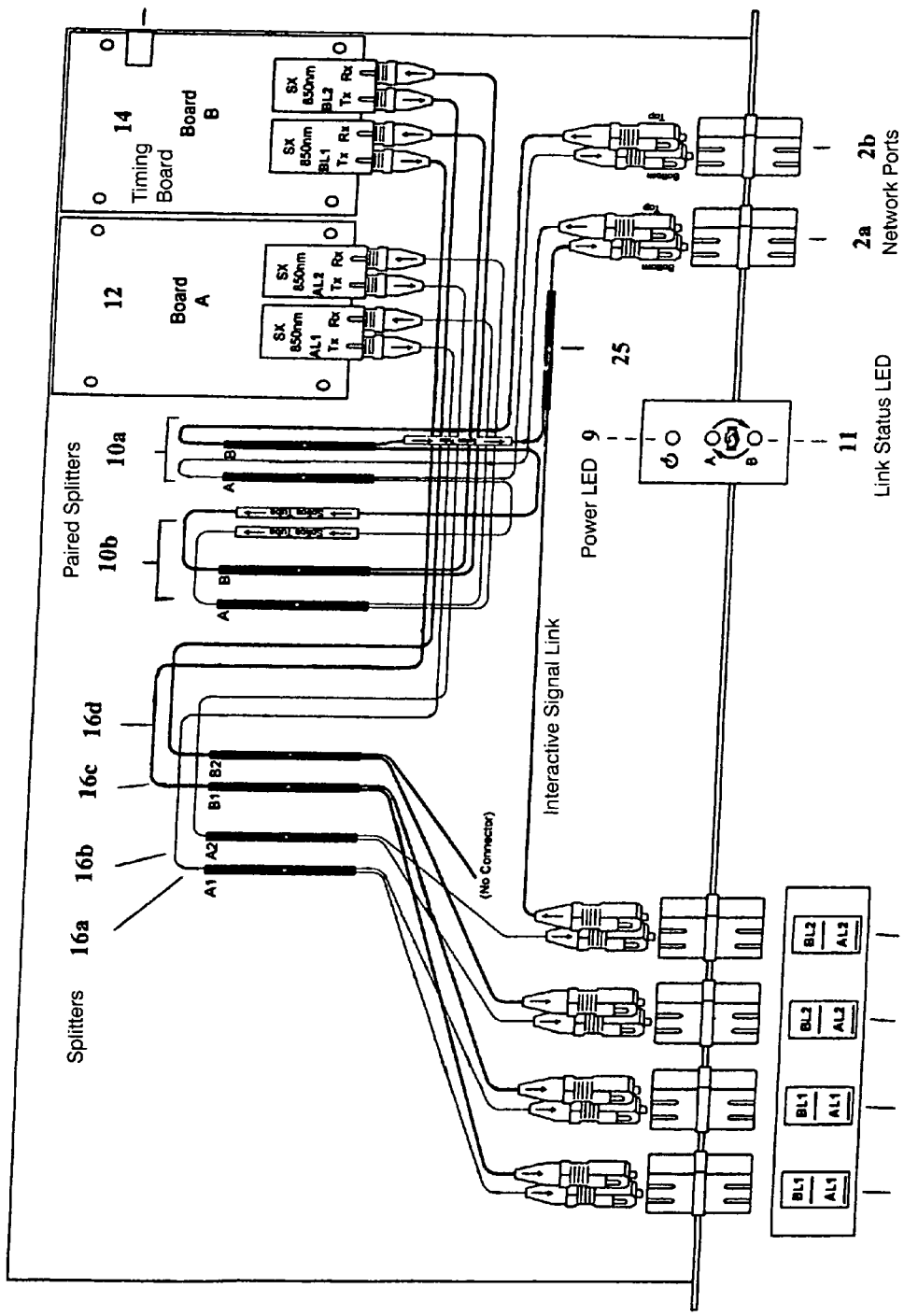
FIG. 7  Interior top view with logical front view modified for monitoring input

MULTIPLE AND PARALLEL ACCESS NETWORK TAP FOR GIGABIT INTERNET LANS

BACKGROUND OF THE INVENTION

1.A. Field of the Invention

The explosive growth of intercommunication between computers over the Internet has created a consequential need for means to monitor networks while they are working, in order to assure that the communication flows stay within acceptable limits of both speed and quality. To assure and measure the connections means that the communications flowing through them must be monitored and the communication flow analyzed.

Monitoring and analyzing the communication flows requires both physical and logical assessment. Physical assessment must test each of the several criteria (e.g. voltage drop, baud, clarity) that define a particular connection's physical constraints; while logical assessment must similarly test each of the several criteria (e.g. routing, authorization, timing) that define a particular communication's logical constraints. Typically, network evaluation was done by reviewing communications logs; more recently, however, it has become a normal procedure to tap into the signal flow over a connection being analyzed.

One problem that had to be solved, for both electrical/copper and optical/fiber connections, was how to tap into the communication flow without interfering with the traffic that was passing through the connection being tapped. Physically, any tap was a potential interference (either from a drop in potential or timing delay); logically, a tap could become an unsought and unwanted network termination. In perhaps no other field is the Heisenberg principle (that the act of observation changes the behavior of whatever is being observed) more keenly felt. As the signal speed and sensitivity of communications and especially computer networks increased, the interference potential from any tap also went up, in linear, locked progression.

1.B. Description of the Related Art

In the field of monitoring network performance, the prior art has focused on the development, and uses, of single-purpose network taps, wherein each tap is devoted to a single analytical instrument and purpose, and devoted to a single connection, at a time. However, more and more identifying the precise nature of a connection's communications requires comparative, parallel analysis of multiple aspects of the network traffic flowing over that connection. This is particularly crucial for properly assessing and evaluating intermittent, context-dependent, or transient signal interference effects; or identifying 'spoofing' signals which are designed to pass a single filter test by mimicking one set of correct attributes. But this leads to a guesswork game as to which monitoring device, or which sequence of monitoring devices, should be used, for one has to know the right technical question to ask, in order to get the right type of answers.

With the increase in network traffic has also come an increase in the number, and differing natures, of problems which can afflict a network. The Internet in particular uses a packet-based protocol which presumes both a constantly changing set of network connections and that each connection is only semi-dependable. Signals can be mis-addressed, mis-routed, mis-timed, disordered, degraded, or otherwise interfered with. Connections can be formed, dropped, spoofed, or otherwise be imperfect; and they definitely change over time—sometimes, over a very short time indeed. This reduces the value of monitoring spread over time, simply because the need is to analyze multiple different aspects of a communication over a connection simultaneously, to better comprehend the condition and context affecting each particular packet. Yet single-usage network taps leave the user with either a serial-over-time analytical option, or a serial-over-communication (and thus self-interfering) analytical option, because providing multiple access required multiple taps, one for each analytical device.

SUMMARY OF THE INVENTION

A multiple-usage, simultaneous and multiple-access network tap is described herein that can be used to monitor the network traffic and communications flow over a particular connection. By incorporating elements that regenerate and spread the signals flowing over the connection, multiple, simultaneous, and parallel analytical devices can monitor that particular network connection through one tap. These elements match the impedance and other characteristics of the network signal, both in the through path, and in the monitoring ports to avoid interference.

In a further embodiment of the invention, a feedback circuit is added which allows interaction with the communication flow, enabling a 'kill signal' to be sent back to a flawed communication's origin, thereby clearing the network of a problem which otherwise might lead to undesired interference, downstream contamination, or breakdown.

DESCRIPTION OF THE DRAWINGS

FIG. 1 is an view from the top left of the exterior of the present embodiment of the invention. The network link flows through two RJ45 interface network ports (2) on the right, while the links to multiple independent and parallel devices for monitoring and analyzing the network communication flow through the connection being tapped flow through the four RJ45 interface monitoring ports (4) on the left. Each port, as can be seen has a top and a bottom. The network ports' tops are where the signals flow into the tap, and the network ports' bottoms are where the signals flow out of the tap. Ports which are not in use can be covered with a dust plug, either one that is tethered to a port (6) or not (7). Not shown (as it is on the rear of the right side) is a standard power supply connection; and there is both a Power (9) and a Link Status LED (11) on the front just left of the network ports.

FIG. 2 is a front view of the exterior of the present embodiment of the invention. In this version the two in-line network ports (2a, 2b) are on the right and four independent and parallel monitoring ports (4a, 4b, 4c, 4d) are on the left; also visible just to the left of the network ports are the Power LED (9) and the Link Status LED (11).

FIG. 3 is a top view of the exterior of the present embodiment of the invention, showing the logical connection between the network input, monitoring and analytical parallel taps, and the network output. Each of the independent, separate, and parallel monitoring devices can tap the network communication flow from either of the network links, where the communication transmits (Tx) and receives (Rx) through the A and B network ports (2a, 2b).

FIG. 4 is a top view of the interior of the present embodiment of the invention, displaying the principal elements other than the connecting cables. The power supply connection (17), and a second power supply connection for an uninterruptible power supply unit (18) on the right rear side are now visible; in the preferred embodiment, these are interchangeable. The network links, running through the network ports (2a, 2b), send the communication traffic through the connection through industry-standard 1×2 multimode 62.5/125 μm with SC receptacles splitters (10) which duplicate the dataflow; one copy then continues on through the network ports (2), while the other goes through a second pair of splitters (also 10), signal-regenerating and timing board (12, 14), and a third pair of splitters (16a, 16b, 16c, and 16d), sending four identical duplicated signals to the monitoring ports (4a, 4b, 4c, and 4d).

FIG. 5 is a second top view of the interior of the present embodiment of the invention, in which the principal elements and their linkages with the connecting cables are displayed. For ease of comprehension, in this drawing four particular changes have been made from the manufactured version. First, the top and bottom portions of the input and output ports are slightly offset (the correct view has already been shown in FIGS. 2 and 4). Second, the inputs and outputs are numbered or indicated by flow arrows (the combined signal flow has already been shown in FIG. 3). Third, the direct and logical cabling paths are displayed to allow a clearer comprehension of and more ready tracing of the linkages and signal flows between the subordinate elements; the connecting optical fibers are not shown as they are placed in the manufactured item, as they are both loosely curved and mated at an angle to reduce fiber stress bending, which leads to multiple overlapping atop each other and the subordinate elements. And, finally, the first paired pair of splitters which both send the signal onward and within the tap are offset (10a and 10b) with their connection directions indicated.

FIG. 6 is a second view of the interior, with the subordinate elements 10, 12 and 14 more closely displayed. Again the power supply connection (17), and a second power supply connection for an uninterruptible power supply unit (18) are visible; for convenience and orientation, the logical view of the front panel including the details of the top and bottom of the monitoring ports (4a, 4b, 4c, and 4d) and of the Power LED (9) and the Link Status LED (11) has been provided, as have signal flow arrows on the connectors.

The signal flow at Gigabit speeds can be fully duplex, with each of the two channels (A→B and B→A) each being a simplex channel. Thus, one simplex channel will run from 2a top to 2b bottom, and the other from 2b top to 2a bottom. To fully meet the Gigabit standard, both simplex channels must be simultaneously duplicated and managed. This is done through the cascading pair of paired splitters found in element 10. The first pair of splitters (10a), take the signal from both simplex channels and duplicate it, with one copy going on through the network ports and the other staying within the tap. The present form of the invention handles each such simplex channel as set forth in the next two paragraphs.

Network port 2a top flows to a splitter (10a-a), where the signal is duplicated, with one part then flowing to network port 2b bottom; similarly, network port 2b top flows to a second splitter (10a-b), where the signal is duplicated, with one part then flowing to network port 2a bottom. To the network, the signal seems to flow through 2a and 2b uninterrupted and unaffected.

The second part of the signal from the splitter (10a-a) into which network port 2a top flowed, flows into a second splitter (10b-a). Each of these redoubled signals then flows first into a first signal regeneration board (12), and then into a third splitter (16a and 16b, respectively), producing 4 identical signals which flow to each of the monitoring ports (4a, 4b, 4c, 4d).

Similarly, the second part of the signal from the splitter (10a-b) into which network port 2b top flowed, flows into a second splitter (10b-b). Each of these redoubled signals then flows first into a first signal regeneration board (14), and then into a third splitter (16c and 16d, respectively), producing 4 identical signals which flow to each of the monitoring ports (4a, 4b, 4c, 4d).

In this fashion, any signal that comes into the tap (which must come through either 2a top or 2b top) both flows through to the network (through 2b bottom and 2a bottom, respectively), and is first doubled (in splitters in 10a), then regenerated (in signal regeneration boards 12 or 14), and then redoubled (in splitters in 16a-d), to make it available simultaneously for to up to four independent, separate, and parallel monitoring devices which can connect in through monitoring ports 4a, 4b, 4c, and 4d.

FIG. 7 is a drawing of an alternative embodiment of this invention, in which an interactive signal can be sent through one of the monitoring ports which has been modified (4d) to allow input through that port (4d, top) to merge, override, or otherwise interact with the signal flowing through one simplex channel at a bidirectional splitter (25) before that channel's communication flow exits the tap (through network port 2a, bottom).

Alternative drawings for a single duplication (two, instead of four parallel monitoring ports) which would require one less pair of splitters have not been submitted as such was believed unnecessarily duplicative.

DETAILED DESCRIPTION

When operating gigabit Ethernet, local area network data communications systems it is vital to monitor data transmission with an absolute minimum of intrusion or disruption of the data stream. 1000BASE-T uses a symbol rate of 125 Mbaud, but it uses all four pairs for the link and a more sophisticated five-level coding scheme. In addition, 1000BASE-T sends and receives simultaneously on each pair. Combining 5-level coding and 4 pairs allows 1000BASE-T to send one byte in parallel at each signal pulse. 4 (pairs)×125 Msymbols/second×2 bits/symbol=1 Gbps.

The transmission can be simplex or half-duplex mode, or transmission can be in full-duplex mode (both directions simultaneously, usually using two oppositely-directed simplex channels).

One of the more common families of existing transmission testing apparatus or transmission analyzer (Tas) has an input impedance of about on hundred ohms. Performance criteria for 1000BASE-T, which is advised to test each link for, includes the return loss and Equal-Level Far End Crosstalk (ELFEXT) as specified in 1000BASE-T. Return loss is a measure of the reflected energy caused by impedance mismatches in the cabling system. ELFEXT is defined as the measure of the unwanted signal coupling from a transmitter at the near-end into a neighboring pair measured at the far-end relative to the received signal level measured on that same pair.

Power sum equal level far end cross talk (PSELFEXT) is a computation of the unwanted signal coupling from multiple transmitters at the near-end into a pair measured at the far-end relative to the received signal level on that same pair. Return loss and ELFEXT have a significantly affect 1000BASE-T operation.

In a local area network, a group of workstations is usually connected to a transmission line or to a digital switch by a circuit called a shared media hub (SMH), which sends all traffic from one workstation to all the other workstations that it serves in addition to sending that traffic to the switch, if required.

Unless the SMH is connected into the line A-B and left permanently in place, dedicated to testing that transmission line at that node, the transmission must be interrupted and restarted each time that the testing SMH is reconnected into the transmission line so that testing can be stared. The transmission would again have to be interrupted to remove the SMH for use in a test somewhere else. Temporarily taking the transmission line out of service twice whenever the line is to be tested is usually unacceptable to the users of the workstations. Leaving the lines untested and letting problems 'fester' is also sufficiently undesirable as to cause significant task and personal problems (as any network technician can confirm).

Permanently installing SMHs at any number of nodes of transmission line for testing purposes only is also unacceptable, when it is considered that each AMH can cost about $3,000. Also, most SMHs, as presently available, are for simplex transmission only and would not support the very common full duplex transmissions without addition of a second SMH. Reasonable cost objectives militate against installing a plurality of paired SMHs at strategic locations in a local area network for the sole purpose of facilitating occasional testing of the network at that particular node.

The use of impedance-matching coupling transformers is widely known in the digital data communications field, where any transmission is likely to encounter interconnecting devices and media of different impedances. However, for digital data transmission, such coupling transformers are usually designed for use over a limited band of digital transmission speed or rates. It may be theoretically possible to custom design a coupling transformer to meet a very wide frequency bandwidth needed to transmit digital signals at rates of from ten megabaud to significantly over one thousand megabaud. However, it should be highly unlikely that such a custom-made coupling transformer would meet cost objectives (mentioned above) in order to permit widespread permanent installation at strategic locations thought a local area network where monitoring and transmission analysis might be desired in the future.

Impedance matching can also be accomplished using discrete passive electronic devices such as individual capacitors and inductors. However, at such digital transmission speed, design difficulties such as component and conductor placement and orientation pose significant design difficulties, which would be expected to affect adversely upon production yield, and operational time demands.

It is theoretically possible to use operational amplifiers to present very high input impedance to a digital transmission line and fairly low output impedance to a transmission analyzer. However, since operation is expected to take place at thousand megabaud speeds, the maximum frequency capability of the operational amplifier must be many times higher than the baud (bit per second) of the digital data transmission signal. Such high-frequency operational amplifiers exist. However, there are four conductors comprising each simplex transmission line. There must be a separate operational amplifier for each conductor of the transmission line in order to reproduce the positive and negative signals involved. Four operational amplifiers connected to the four conductors of a digital data transmission line must have the same maximum frequency capability. Otherwise the positive and negative transitions of the amplified digital data signals will lack and thus impair the operation of the digital transmission analyzer.

In accordance with one aspect of the present invention, the input terminals of four high-frequency operational amplifiers that are manufactured on a single integrated circuit die are connected to the four conductors of a digital data transmission line serving a local area network. The output terminals of the four operational amplifiers are connected through a suitable impedance match to the input of the digital transmission analyzer.

It is an object of the present invention to provide a permanent, inexpensive facility in multiple locations of a local area network to allow monitoring of data transmission traffic without disrupting ongoing data transmission by either interrupting transmission or upsetting its characteristic transmission impedance.

It is another object of the present invention to provide an interface or monitor port on a local area data transmission network for use with either simplex and half-duplex transmission or with full duplex transmission.

It is still another object of the present invention to provide a monitor port that is sufficiently inexpensive that it can be installed at a plurality of nodes at the initial installation of a local area network transmission system and left in place, permanently.

It is another object of the present invention to have an uninterruptible power supply to the tap, in case of power failure, so the potential link signal will not delay any link between the monitored devices, resulting in network data flow interruption.

The best embodiment of the present form of the invention uses a passive-link integrity which allows the network communication to flow through the tap even when the power is turned off to either the tap or any of the monitoring devices to which it may be connected.

Because the network link, to meet 1000 Base T standards, will have twinned input and output ports, each of which will have a top and bottom part comprising a impedance-matching coupling transformers, thereby giving the full duplex mode (both directions simultaneously, using two oppositely-directed simplex channels). Each simplex channel is connected to a splitter, which duplicates the signals flowing over the channel without changing the characteristics otherwise. (Both impedance-matching coupling transformers and splitters are known within the industry.) From the splitter, one line goes back out through the matching impedance-matching coupling transformer, completing that simplex channel through the tap. The other line from the splitter goes through a second splitter where it becomes two lines, which then both through a signal regenerating board, and then through a second pair of splitters where it becomes four lines, each of which now goes to an impedance-matching coupling transformer serving as a monitoring port, to which an analytical or monitoring device can be attached and through which the signal can be monitored and analyzed.

It is possible to decrease the number of stages of splitters (remove the second pair, and only two simultaneous, parallel ports for each simplex channel will exist) or to increase them, though this will require adding additional signal-regenerating boards.

Each connection is best thought of as a pair of channels (A and B), through which communications flow simultaneously into and then out of the tap. (In on A, out on B; and in on B, out on A.) To monitor the communication, the communication flowing on each channel is simultaneously and in parallel duplicated; where there was A, there is now A and A'; where there was B, there is now B and B'. A and B are sent off out of the tap, while the duplicated A' and B' are now available for monitoring and analysis without affecting the original A or B. For two parallel devices, each of A' and B' must be duplicated a second time; for four parallel devices, A' and B' must be duplicated a second and third time (2*2, after all, equals 4).

These extra steps may require that the signals be regenerated to overcome potential frictional interference and timing delays.

In an alternative embodiment of this invention, one of the monitoring ports can become an interactive source for injecting signals into the communications passing through the network link. Preferentially, this will be the monitoring port (4d) closest to the network ports (2a, 2b). This port will receive, at the bottom port (4d bottom) the signal from one simplex channel (2a top), but not from the second simplex channel (2b top); instead, the device connected to that now-interactive monitoring port will send out a feedback signal (through 4d top). This interactive signal will be merged with, and override or otherwise interact with, the signal from the second simplex channel (2b, top) (which as before will flow through the first splitter (10a-b) and back towards the other network port (2a)), at a bidirectional splitter (25) before actually reaching the other the other network port (2a).

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended this disclosure encompass any such modifications or embodiments. The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to those elements disclosed in this specification, even though those known functional equivalents are not exhaustively detailed herein.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of network communication taps, and which may be used instead of or in addition to features already described herein. The industry-standard components not specifically detailed herein are not limiting but instructive of the embodiment of the invention, and variations which are readily derived through market or mechanical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A network tap that enables multiple, independent and parallel monitoring devices to analyze communication flows through a connection without interfering with such flows, comprising:
   means for supplying power to said network tap;
   a pair of network ports, each network port having an input and output, for connecting said network tap to said connection;
   a first internal channel for the input of a first communication flow through a first member of the pair of network ports, that duplicates and then forwards a first communication flow both within said tap and to an output of a second member of the pair of network ports;
   a second internal channel for the input of a first communication flow through the second member of the pair of network ports, that duplicates and then forwards a second communication flow both within said tap and to an output of the first member of the pair of network ports;
   at least one pair of monitoring ports, each monitoring port having an output for each of the first and second internal channels; and,
   for each internal channel and communication flow forwarded within said tap, means for further duplicating and forwarding the communication flow to the outputs of said pair of monitoring ports.

2. A network tap as in claim 1, wherein the internal channel for each input of a communication flow through a member of the pair of network ports, that duplicates and forwards the communication flow both within said tap and to an output through the other member of the pair of network ports, further comprises:
   a first splitter with a first, single-line end to which said input is connected and a second, double-line end with a first and second line, said first line connecting to said output through the other member of the pair of network ports and said second line connecting to said means for further duplicating and forwarding the communication flows to the outputs of said pair of monitoring ports.

3. A network tap as in claim 2, wherein said means for further duplicating and forwarding the communication flow to said pair of monitoring ports further comprises, for each communication flow and internal channel:
   a second splitter with a first, single-line end to which said second line from said first splitter is connected, and a second, double-line end with a first and second line; and,
   a signal-regenerating circuit board with a pair of inputs to which said first and second line from the second splitter are connected, and a pair of outputs connecting to the outputs of said pair of monitoring ports.

4. A network tap that enables multiple, independent and parallel monitoring devices to analyze communication flows through a connection without interfering with such flows, comprising:
   means for supplying power to said network tap;
   a pair of network ports, each network port having an input and output, for connecting said network tap to said connection;
   a first internal channel for the input of a first communication flow through a first member of the pair of network ports with means for duplicating and forwarding the first communication flow both within said tap and to an output of a second member of the pair of network ports;

a second internal channel for the input of a second communication flow through the second member of the pair of network ports with means for duplicating and forwarding the second communication flow both within said tap and to an output of the first member of the pair of network ports;

at least two pairs of monitoring ports, each monitoring port having an output for the first and second internal channels; and, for each internal channel and communication flow forwarded within said tap, means for further duplicating and forwarding the communication flows to the outputs of all the monitoring ports.

5. A tap as in claim 4, wherein said means for duplicating and forwarding the communication flow both within said tap and to an output of a member of the pair of network ports comprises a first splitter having a first single-line end connecting to said input and a second, double-line end with a first and second line, said first line connecting to the output of a member of the pair of network ports, and said second line connecting to said means for further duplicating and forwarding the communication flows to the outputs of all the monitoring ports.

6. A network tap as in claim 5, wherein said means for further duplicating and forwarding the communication flows to the outputs of all the monitoring ports further comprises, for each communication flow and internal channel:

a second splitter with a first, single-line end to which said first splitter's second line is connected and a second, double-line end with a first and second line; and, a signal-regenerating circuit board, with a pair of inputs to which said second splitter's first and second line are connected, and a pair of outputs;

wherein said pair of outputs of the signal-regenerating and timing coordination circuit board connect with means for further duplicating and forwarding the communication flows to the outputs of all the monitoring ports.

7. A network tap as in claim 5, wherein said means for further duplicating and forwarding the communication flows to the outputs of all of the monitoring ports further comprises, for each communication flow and internal channel:

a second splitter with a first, single-line end to which said first splitter's second line is connected and a second, double-line end with a first and second line;

a signal-regenerating circuit board, with a pair of inputs to which said second splitter's first and second line are connected, and a pair of outputs; and, for each output from a signal-regenerating circuit board, a third splitter with a first, single-line end to which said output is connected, and a second, double-line end with a first and second line, said first and second lines connecting with the outputs of a pair of monitoring ports.

8. A network tap as in claim 7, wherein:

for the next level of duplication of signal, each said third splitter constitutes a second splitter; and, for the next level of duplication of signal and third splitter constituting a second splitter, the signal-regenerating circuit boards and third splitters are likewise duplicated.

9. A network communications tap as in claim 4, further comprising:

a bidirectional splitter having a first, single-line end connecting to the output of a network port, and a second, double-line end with a first and second line, in which said first line is connected to said means for duplicating and forwarding a communication flow for an internal channel within said tap, and said second line is connected to an input of an interactive monitoring port;

said input of the interactive monitoring port allowing a signal from a device attached to said interactive monitoring port to be sent into said tap;

whereby said device connected to said input of the interactive monitoring port may send a signal through said interactive monitoring port's input and said second line through the bidirectional splitter to the output of a network port, the signal merging or overriding that from the first line.

* * * * *